United States Patent [19]
Gauthier et al.

[11] Patent Number: 5,415,954
[45] Date of Patent: May 16, 1995

[54] ELECTRICAL CONTACT OUTLET FOR ANODES

[75] Inventors: Michel Gauthier, Laprairie; André Belanger, Ste-Julie; James K. Jacobs, Toronto; Guy St-Amant, Trois-Rivières-Ouest; Serge Ricard, Shawinigan-Sud, all of Canada

[73] Assignee: Hydro-Quebec, Montreal, Canada

[21] Appl. No.: 52,833

[22] Filed: Apr. 27, 1993

[30] Foreign Application Priority Data

May 8, 1992 [CA] Canada .................... 2068290

[51] Int. Cl.6 ........................................... H02M 2/26
[52] U.S. Cl. ........................ 429/94; 429/161; 429/211
[58] Field of Search ..................... 429/94, 211, 161

[56] References Cited

U.S. PATENT DOCUMENTS

| 3,761,314 | 9/1973 | Cailley | 429/94 |
|---|---|---|---|
| 4,053,687 | 10/1977 | Coibion et al. | 429/94 |
| 4,303,748 | 12/1981 | Armand et al. | |
| 4,357,401 | 11/1982 | Andre et al. | |
| 4,578,326 | 3/1986 | Armand et al. | |
| 4,824,746 | 4/1989 | Belanger et al. | |
| 4,830,940 | 5/1989 | Keister et al. | 429/94 X |
| 4,879,190 | 11/1989 | Lundsgaard | 429/94 |
| 4,897,917 | 2/1990 | Gauthier et al. | |
| 4,963,445 | 10/1990 | Marple et al. | 429/94 |
| 5,008,165 | 4/1991 | Schmöde | 429/94 |
| 5,100,746 | 3/1992 | Muller et al. | 429/94 |

FOREIGN PATENT DOCUMENTS 0073555 3/1983 European Pat. Off. .
2589620 5/1987 France .

*Primary Examiner*—Stephen Kalafut
*Attorney, Agent, or Firm*—Oblon, Spivak, McClelland, Maier & Neustadt

[57] ABSTRACT

Electrical contact outlet for an anode sheet of a lithium generator with polymer electrolyte, consisting of one or more multilayer electrochemical cells. The cell comprises at least one lithium base sheet having a thickness between about 1 and 50 microns to constitute the anode and its collector and additionally includes a cathode and its collector as well as the polymer electrolyte. A lateral end of the anode sheet extends beyond corresponding ends of the cathode and the collector to constitute a projecting zone. A metallic layer consisting of at least one rigid metal which is compatible with lithium is in electrical contact with the lateral end of the anode sheet but without electronic contact with the other components of the cell. The metallic layer constitutes the external terminal of the generator when the latter is in non-finished condition. According to a variant, a conductive and cohesive intermediate metallic zone, which consists of lithium or lithium rich ductile alloys is in intimate contact with the lateral end of the anode sheet and the metallic layer mentioned above is therefore in electrical contact with the lateral end of the anode sheet by means of the intermediate zone of lithium. Generators provided with such contact outlet as well as a process for the preparation of these contact outlets are described.

61 Claims, 4 Drawing Sheets

ELECTRICAL CONTACT OUTLET FOR ANODES

BACKGROUND OF THE INVENTION (a) Field of the Invention

The invention describes devices and processes including lateral electrical contact outlets on lithium sheets which are used as anodes in lithium generators consisting of at least one. multilayer assembly of thin electrode films and polymer electrolytes in wound or stacked form. The patent describes materials and devices including a contact outlet on thin sheets of lithium in the vicinity of the plastic materials of the generator as well as procedures for producing these devices. The claimed lateral contact outlet devices are particularly suitable for all solid polymer electrolyte generators because they are very slightly resistive, they are adapted to the chemical reactivity of lithium and its alloys and are capable of ensuring an efficient heat exchange between the generator and its external casing. In one of the preferred devices, the electrical contact on the thin lithium sheets is obtained with a compatible metal, preferably copper, iron, nickel of alloys thereof, directly applied on lithium. A variant of this device consists in first providing an intermediate metallic layer of a lithium base metal or low melting lithium alloys which is applied in the form of a compact deposit at the end of the sheets of lithium. This deposit, called intermediate metallic layer, thereafter enables to obtain a second electrical contact, on its other face, with an inert and rigid metal, which is compatible with lithium, and is capable of maintaining the quality of the electrical contact between the anode of the generator and the external casing in spite of a possible superficial oxidation of lithium or its alloys.

The application of a metal such as copper which is in direct contact with lithium enables, whenever possible, to use the generator in dry air and additionally contributes to facilitate a thermic transfer between the latter and its external casing. The alternative which consists in using a metal such as lithium or its low melting alloys to provide an intermediate metallic layer, solves the problem of chemical reactivity with the lithium anode, facilitates the self-welding and cohesion of the deposit and ensures some deformability of the contact zone during thermic and electrochemical cycles of the generator. On the other hand, the low melting point of the filler metal facilitates its application on the edges of thin lithium films, even at a short distance from the other plastic components of the generator: insulating support films of lithium, electrolyte and composite cathode. The invention includes preferred embodiments and also describes means to obtain conductive and cohesive metallic deposits for the metallic layer which is compatible with lithium as well as for the lithium base intermediate layer. The quality of the weldings obtained according to the embodiments of the invention, between lithium and its alloys and certain hard and compatible metals is sufficient to preserve the electrical contacts of the anode from an oxidation of the surface of lithium by the surrounding gaseous phase. Another advantage of the devices according to the invention is to ensure an efficient heat transfer between the sheets of the generator and the outer casing of the latter. This aspect is particularly important for the safety of polymer electrolyte lithium generators where no free liquid electrolyte is present to facilitate heat exchanges between the generator per se and its external casing.

(b) Description of Prior Art

The development of primary and rechargeable lithium generators, has been on the increase during the latter years following an increasing demand for dense and light sources of energy. The important density of energy and the remarkable properties of preservation of lithium batteries give them a noted advantage over the other available systems which operate in aqueous media. However, a generally high manufacturing cost, a power which is sometimes limited at low temperature as well as consideration of safety with respect to the use of lithium still limit their use to small batteries and specialized markets.

One way to remedy these limitations consists in replacing the liquid organic electrolytes presently used in lithium generators by thin films of polymer electrolytes generally consisting of polyether complexes and lithium salts. It is known that plastic films may be prepared rapidly and with large surfaces, by means of automated processes, in the form of thin films of the order of a few micrometers thick. These films, which are cheap to produce, enable, in principle, to produce large size and high power generators by a mere increase of the surface of the generator in the form of thin films. On the other hand, the preparation of an all solid generator by using non-fusible solid polymers, instead of organic liquids, enables, in principle, to produce a safer system because it is more susceptible of limiting the speeds of reactions of the chemical reactants with one another or, in case of accidental exposure to ambient air or water. The polymers which are capable of being used in such solid state generators have been described in previous patents (U.S. Pat. Nos. 4,303,748; 4,578,326 and 4,357,401) as well as ways of assembling them (U.S. Pat. Nos. 4,897,917; 4,824,746 and French Patent No. 87 08539).

An increase of the active surface of lithium generators when polymer electrolytes are used is however met with the difficulty of developing equivalent surfaces for the current collectors of the anode and the cathode. A practical solution consists, for example, in the case of the cathode, to use aluminum and, in the case of the anode, to use the sheet of lithium per se as current collector. This approach is sometimes used in coiled organic liquid electrolyte generators, for example in AA, C or D formats; in this case, the anode consists of a film of lithium having a thickness of about 130 micrometers ($\mu$). At such a thickness, lithium is sufficiently resistant to be freely handled by means of assembling machines and the collection of current from the anode is then ensured through the end of the sheet of lithium or, if needed, by means of transverse metallic tongues which are fixed to the film of lithium at regular intervals in order to reduce the ohmic drop in the collector. This solution is difficult to transpose in the techniques used for polymer electrolytes generators which use much thinner assemblies and which require lithium thickness between 40 and 1 micrometers. At these thicknesses, the films of lithium are much less mechanically stable and should be supported (e.g. U.S. Pat. Nos. 4,824,746 and 4,897,917) in order to be handled by assembling machines. The limited electrical conductivity of thin metallic lithium prevents on the other hand, in the case of coiled batteries, to collect the current which has accumulated at the end of the coil since the length to be drained is substantial and causes in a substantial ohmic drop in the collectors. This limitation, which is due to the thinness of the films and the lengths to be used in a technique based on ultra-thin films, therefore imposes a lateral collection of the coiled device in order to reduce the distance to be collected. This observation is also true in the case of generators which are made by stacking discontinuous thin batteries or are mounted in zigzag in order to reduce ohmic drops. A known way to ensure lateral collection consists in applying transverse conductive tongues at regular intervals of the coiled anode or cathode in order to reduce the length to be drained.

However this possibility is hardly suitable for very thin films (local over thickness or low mechanical property of the tongue). Another possibility consists in laminating the anode of lithium on a thin inert metallic collector thereby enabling a lateral collection, through conventional processes of welding, on the inert collector. However, this additional metallic collector for the anode has been found to be extremely damaging in terms of weight and cost. By way of example, the cost of nickel or copper sheets, which are compatible with lithium, is about 1$/ft$^2$ at the required thicknesses (e.g., 5–10$\mu$).

The manufacture of ultra-thin capacitors including metallized plastics by pulverizing a lateral collector on the edge of the coiled films represents a more interesting model for the technique of assembling lithium batteries based on polymer electrolytes. This type of capacitor generally consists of two identical insulating plastic films (polypropylene or polyester, about 3 to 30 micrometers) which are metallized on one face, with the exception of one non-metallized lateral band, and are co-wound with a slight offset so as to be able to collect each of the films at one opposite end by means of a metallic deposit applied on the metallized end of each of the two films. The electrical contacts used in these devices are generally based on zinc, aluminum or silver applied in the form of conductive pastes including an organic binder or in the form of deposits obtained by pulverizing: by flame spray or with an electrical arc (or shooping) in the case of zinc and aluminum. The latter type of contact outlet, known in the industry of capacitors, is described in the European Patent Application published under number 0073555 and French Patent Application published under number 2,589,620.

It has been observed experimentally that these types of assembly and lateral contact outlet, which are compact, rapid and economical may be adapted to polymer electrolyte generators when inert metallic collectors are used, for example, when the collector for the cathode is aluminum. Up to now, these processes would not seem to be easy to directly transpose to the collection of lithium anodes consisting of thin lithium films for the following reasons:

the pulverization of zinc by flame spray used in capacitors is not compatible for lithium generators because of the release of water due to the combustion;

the compositions of silver or zinc powder, generally based on organic binders of the epoxy type are not chemically stable in the presence of lithium, particularly at high temperatures;

the chemical reactivity of lithium prevents the use of known metals such as zinc and aluminum and their alloys which are normally used for pulverization under an electrical arc (shooping) during the manufacture of the capacitors. As a matter of fact, it has been experimentally observed that these metals, react spontaneously with lithium to give hard and friable inter-metallic compounds which prevent the formation of a slightly resistive and reliable electrical contact;

the metals which are compatible with lithium such as nickel, iron, copper, molybdenum, etc. have very high melting points and for this reason appear to be hardly applicable directly by vaporization on a multilayer assembly of lithium films and plastic materials. By way of example, tests made by the Applicant with a commercial device for plasma pulverization (Plasma Spray) with a Medco device (Division of Perkin-Elmer) Model MBN using nickel or copper powder as coating metal, show that there is an important heat degradation of the plastic films, which are PP insulating material and polymer electrolyte of the generator, when the metal is projected with a hot inert gas on the lateral border of the anode of a coiled generator. In principle, the technique of pulverization with an electric arc of these same metals seems to present the same difficulty because of thermic shock with the other plastic components of the generator.

SUMMARY OF INVENTION

The present invention aims at solving the difficulties associated with the lateral collection of lithium film anodes in thin film polymer electrolyte generators. The invention describes devices for providing compact lateral contacts, which are only slightly resistive and are chemically stable, on anodes of ultra thin lithium sheets. The invention also comprises processes for the rapid application of these contacts so as to facilitate the production of reliable and economical ultra thin polymer electrolyte generators. Other advantages of the invention will appear in the description which follows.

The present invention describes an arrangement of lateral electrical contact outlets on thin lithium sheets used as anodes in thin electrochemical devices (less than 150 micrometers per elementary cell) utilizing substantial lengths of films, which are generally in the form of cylindrical windings, flat or in the form of a stacking of one or more thin batteries.

The preferred devices according to the invention include an electrical contact provided on the lateral projection of the anode sheet(s) used as collector, in a polymer electrolyte generator. These contacts are preferably obtained by application of one or more conductive metallic layers on the surface and/or the sides of the edges of the anode sheets so as to facilitate the electrical collection of the anode assembly and also to facilitate heat exchanges between the nucleus of the generator and its external casing.

BRIEF DESCRIPTION OF DRAWINGS

The characteristics and advantages of the invention will appear from the description which follows of embodiments given by way of illustration but without limitation with reference to the annexed drawings in which:

FIG. 3b is a partial enlargement of FIG. 3a;

FIG. 3c is a schematic illustration in cross-section of a winding made with the 5 films of FIG. 3a;

FIG. 4b is a variant if FIG. 4a; and

DESCRIPTION OF PREFERRED EMBODIMENTS

Figure 1:
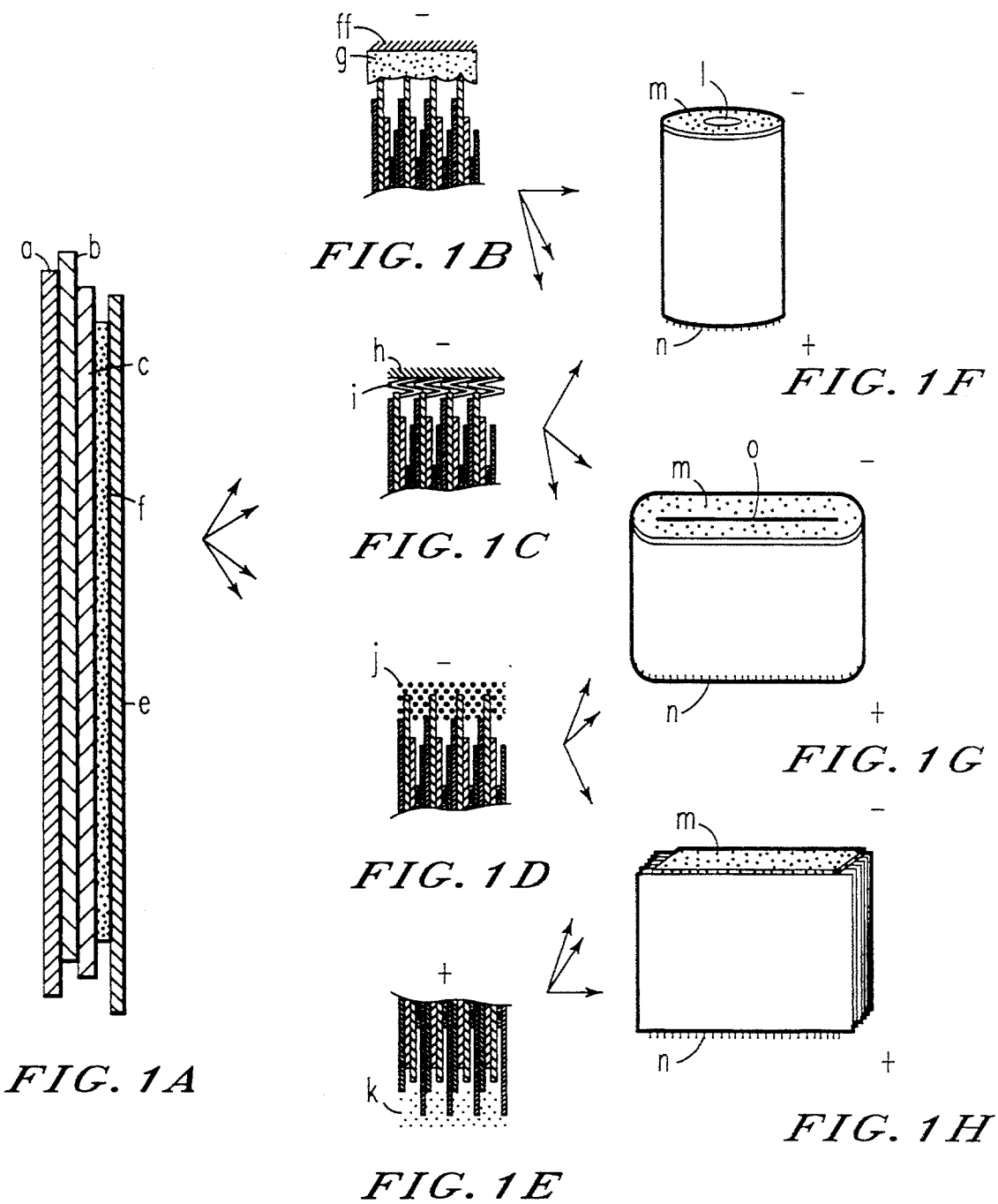
FIG. 1a is a cross-section of the laminated sheet of a generator with lateral projection of the anode of lithium on which contact may be established.
FIG. 1b is a schematic illustration of an intermediate layer on which a second metal defining an electrical contact has been applied.
FIG. 1c is another schematic illustration of an intermediate layer made by compaction and self-welding of the ends of the films of lithium between one another and on which a second metal defining an electrical contact has been applied.
FIG. 1d is a schematic illustration showing the direct application of a pulverized layer of a metal which is compatible with lithium in intimate contact with the end of the sheets of lithium of the anodes.
FIG. 1e is a schematic illustration of the contact at the cathode.
FIG. 1f is a schematic illustration of a generator in the form of a cylindrical winding according to the invention.
FIG. 1g is a schematic illustration of a generator according to the invention obtained by winding a laminate on a flat mandrel.
FIG. 1h represents a flat generator consisting of a plurality of laminates stacked over one another and collected at the end.

The preferred devices are described schematically in FIG. 1 with their main characteristics. FIG. 1a illustrates a cross-section of the laminated sheet of the generator with lateral projection of the lithium anode, x, on which contact may be established. On this Figure, y represents, by way of non-limiting example, the projection of the collector of a cathode enabling the application of a second lateral contact, which is also compact, obtained by utilizing known techniques used with electrical capacitors; silver conductive pastes, zinc and aluminum powders, welding tin . . . directly applied on the inert collector.

FIGS. 1b, 1c and 1d illustrate three preferred embodiments of lateral contacts adapted for the collection of anode sheets of lithium not provided with inert collectors. The possible materials used to constitute the various layers illustrated are identified in the description and the examples which follow, as well as the main thermic, electrical and mechanical processes enabling to obtain optimum electrical and thermic contacts. A preferred way to produce the devices of the invention consists in pulverizing at least one of the metallic layers of the lateral contact. The advantages of the layers obtained by pulverization are: the compactness of the deposit to reduce the over-crowding of the contacts, the capacity of following the surface contour of the substrate without any risk of mechanical damage in the contact zone, the capacity of optimizing the heat exchange surface and the surface collection of the entire lateral contact surface of the generator.

Figures f, g and h, illustrate three preferred embodiments of generators in which the devices of the invention may be used. FIG. 1f illustrates a cylindrical winding device with central nucleus 1, in which, at the upper end, there is a collection device for the anode, m, made with either of arrangements of FIGS. 1b, 1c or 1d. The lower end includes, by way of example, a device, n, for lateral collection, illustrated at 1e in which k is a metal which is in contact with the inert collector of the cathode. Element 1g illustrates a flat generator obtained by winding at least one laminated element, illustrated in FIG. 1a, on a flat mandrel, o, also collected at the ends, m and n. FIG. 1h, illustrates a flat generator consisting of one or more laminated elements, illustrated in FIG. 1a, individually stacked or folded in zig-zag shape and also collected at the ends, m and n.

A first preferred embodiment of the invention is illustrated in FIGS. 1a and b. This device consists of an added intermediate metallic layer g, made of lithium or its alloys and thus enables to reduce the thermic shock produced on the other plastic components of the generator, by applying and welding low melting metal on the projection, x, of the sheets of the anode, b. This layer is applied at the lateral ends, and if needed on the edges, of the stacked sheets of lithium of the generator. This intermediate metallic layer is deposited under conditions enabling the production of a relatively dense, conductive and cohesive layer g, of about 1 mm, which intimately welds and mechanically consolidates the different sheets of the anode, b, between one another so as to prevent losses of electrical contact by a possible oxidation at the surface of the sheets. A preferred way of applying this intermediate metallic layer consists in contacting, under an inert atmosphere, the edges of the sheets of lithium with lithium in liquid form, or close to its melting point, by means of a process such as pulverization of droplets of lithium or alloys thereof having lower melting points. The intermediate metallic layer, g, thus constituted, facilitates the application of a second more rigid metal, ff, selected for its compatibility with the lithium of the second intermediate layer, and also facilitates electrical and thermic exchanges between the nucleus of the generator and its external casing. In this non limiting example, the generator includes, in addition to the sheets of lithium, an insulating film of polypropylene which may or may not adhere to the sheet of lithium, a, the electrolytes of the generator, c, the cathode, f, and its collector, e. These films are more or less offset with respect to one another by plurality of mm. These offsets are very important relative to the true thicknesses of the films which are of the order of 1–40 microns; on FIG. 1, the thickness of the films is amplified disproportionately to facilitate its understanding.

The use of a metal such as lithium or its low melting alloys, g, as an intermediate metal serving as contact outlet with the thin sheets of the anode has the following advantages:

1) it solves the problem of chemical compatibility of the added metal with the sheets of lithium;
2) it enables to ensure an intimate electrical and thermic contact (lithium easily welding to itself by melting and/or mechanical pressure) and consolidates the lateral end of the anode;
3) it enables some possibility of deformation of the contact zone during thermic or electrochemical cycle of charge/discharge (lithium and some of its alloys being highly malleable);

4) the low melting points of lithium (180° C.) and of some of its alloys facilitate their application on the thin sheets of lithium even in the vicinity of various plastic films of the generator;

5) the capacity of lithium to produce a coherent and dense deposit enables to protect the area of contacts of the sheets from oxidation by impurities which may be present within the generator.

The processes of applying metal such as lithium so as to constitute this intermediate metallic layer, g, are however associated with a major difficulty, e.i., the need to heat lithium or its alloys at a temperature close to the melting point without risking to cause the oxidation of lithium and without risking to melt the plastic components which are adjacent the sheets of lithium. Preferred processes are described to solve this problem, such as mechanical pulverization or pulverizing under electric arc, under inert atmosphere, of liquid or semi-liquid lithium at a temperature enabling the welding of the sheets to the added metal. Alternatives to the process of pulverization are also possible, such as by producing the intermediate layer from alloys of lithium having low melting point. The compositions of the lithium base alloys may be selected, by way of non-limiting example, among the following binary systems: Li-Ca, Li-Sr and Li-Na, Li-Mg, described in the text book "Constitution of Binary Alloys" Ed. Max Hansen published by McGraw-Hill Book Company, N.Y., or among more complicated systems including these elements whose compositions are rich in lithium and which are substantially liquid at temperatures lower than 350° C.

Figure 2:
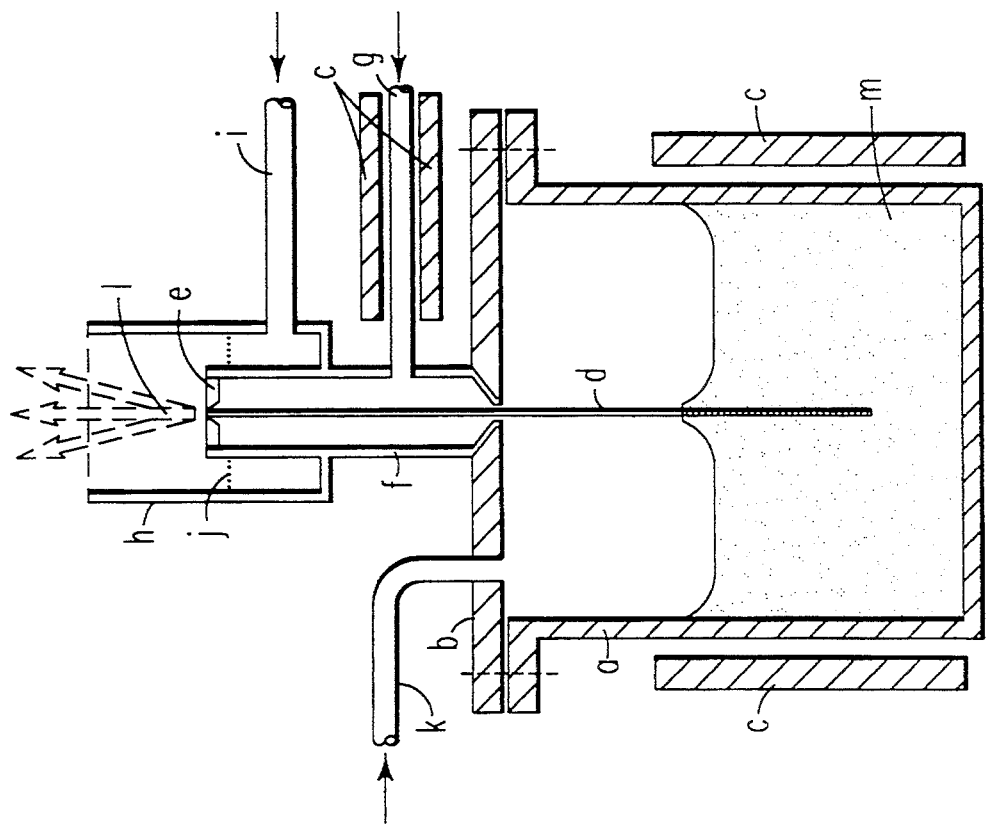
FIG. 2 is a schematic illustration of a device for pulverizing molten lithium.

FIG. 2 illustrates, by way of example, a device for pulverizing molten lithium through a mechanical process which utilizes a jet of hot inert gas to project droplets of lithium in particular form, which is liquid or semi-liquid, thereby producing electrical contact of good quality on the edges of the sheets of lithium. The main elements of this Figure are: a, a vat containing lithium or its alloy in molten state m, b, the impervious cover of the vat a, c, heating elements for vat a and a hot inert gas inlet g, d, a capillary tube of internal diameter of about 0.4 mm, e, a pulverization nozzle, f, an external tube for the circulation of hot gas. In this device, a jet of molten metal, 1, is obtained by forcing the lithium to rise, by means of an inert gas under pressure introduced at k, in a capillary tube d so as to produce a jet of liquid or semi-liquid particles which is carried with a hot inert gas which circulates in the pulverization nozzle e. A protection sheath h also flushed with a colder inert gas entering at i and diffused at j, enables to use the device in the presence of oxygen or dry air.

Other variants of this mechanical process for the production of the intermediate layer may be used, in particular by pulverizing molten lithium in an electric arc, supplied by two lithium rods, by means of an inert gas which projects the fine droplets of liquid lithium against the sheets of the anode. This process which is derived from zinc or aluminum shooping may be carried out by directly utilizing rods of lithium or lithium rich alloys to generate the electrical arc; preferably, these rods will be extruded directly in the proximity of the electrical arc.

A second contact outlet preferred device based on an alternative way of producing the intermediate metallic layer is illustrated FIG. 1c. It consists in providing, when producing the anode film and when assembling the generator, a free lithium projection, x, relatively important, preferably between 0.2 and 1.0 cm, to enable the production, after assembly, of an intermediate metallic layer, i, formed from the projection of the anode sheet. The intermediate conductive layer, i, is preferably prepared by compaction and self-welding of the ends of the films with one another. One way of producing this intermediate layer in-situ without any risk of oxidation of the surfaces of lithium, consists in welding the end of the films with one another by mechanical pressing or local welding of lithium, by ultra-sonic wave or by melting.

In the two devices 1b and 1c, based on the production an intermediate layer consisting of lithium or alloys thereof, it is necessary to apply a second conductive layer, respectively f and h, consisting of a metal which is rigid and compatible with lithium. This second metallic layer is essential and should be very intimately welded with the lithium of the intermediate layer to maintain the property of electrical contact between the anode and the external casing of the generator in spite of a possible superficial oxidation of lithium or its alloys. The application of a second layer, f or h, on the lithium base intermediate metallic layer, preferably nickel, copper, iron, molybdenum, titanium or alloys thereof is facilitated by the increase of mechanical behavior of the multilayer anode/intermediate layer assembly and by the fact that the metallic layer, g or i, separates and protects the plastic components of the generator against a thermic or mechanical shock resulting from the insertion of this second metal. This happens, for example, when applying metal, f or h, by processes of pulverization by plasma or electrical arc or still, more easily, by mechanical, thermic or electrical processes, for example, by ultra-sonic treatment, melting or spot-welding. These processes are used to fix and intimately weld the second metal, f or h, to the metal of the intermediate layer, g, so as to be able to produce a complete lateral current collector enabling the passage of current and heat through the external sheath of the generator.

More generally, the provision of an intermediate metallic layer which separates the sheets of lithium from the second layer of a rigid metal which is compatible with lithium presents the advantage of well consolidating the sheets of lithium with one another and above all of protecting the other plastic components of the generator from thermic or mechanical shocks. This improvement enables to substantially reduce the width of the lateral projections of the electrodes which are required to prevent thermic degradations and accidental short-circuits resulting from the application of external contacts.

A third preferred lateral contact outlet device on the lithium anode of an electrochemical generator is illustrated in FIG. 1d. This simple device is particularly well adapted to a polymer electrolyte generator. It is obtained by directly producing a pulverized layer of a metal which is compatible with lithium, j, more particularly copper, nickel, iron or alloys thereof, in intimate contact with the end of the sheets of lithium or the anode. The interest of this specific device is to optimize both the electrical and thermic conductivity of the lateral conduction layer zone, particularly when the metal is in direct contact with the sheets of aluminum and is based on copper. We have verified that these devices may be obtained by pulverization under electric arc and it was established, by means of tests, that an electrical contact of quality is obtained on thin sheets of lithium, without thermic damage for the plastic components, in spite of the fact that the pulverized metals have very high melting points, over 1000° C. Production of conductive metallic layers which adhere to lithium is obtained, by pulverization under an electric arc between two copper wires of 1.6 mm diameter which are continuously supplied by means of a jet of local compressed air applied at the level of the electrical arc. The power used for the arc is 1–3 kW. Under the experimental conditions used and with the selected designs, no thermic damage or short-circuit was observed on the generator. A process of pulverizing these metals which are compatible with lithium under an electric arc therefore enables to prepare the contact outlet device of an anode of lithium without the inert collector film of FIG. 1d, rapidly, safely and economically. In particular, the pulverization of copper under an electric arc, on lithium, may be carried out under dry air as well as under an inert atmosphere and does not result in dusts of reactive lithium. Moreover, the use of copper as metal contact ensures an optimal thermic exchange capacity between the generator and its external casing.

FIG. 3 illustrates a laboratory device used to demonstrate the quality of the lateral electrical contacts produced on free sheets of lithium. A symmetrical winding 3c, illustrated schematically, is produced by co-winding, on a plastic nucleus of 1.3 cm diameter, the combination of the following films:

a—3 films of bi-stretched polyethylene 28μ thick and 12.1 cm wide,
b—a film of aluminum, 20μ thick and 11.4 cm wide,
c—a film of lithium, 35μ thick and 12.7 cm wide.

Figure 3C:
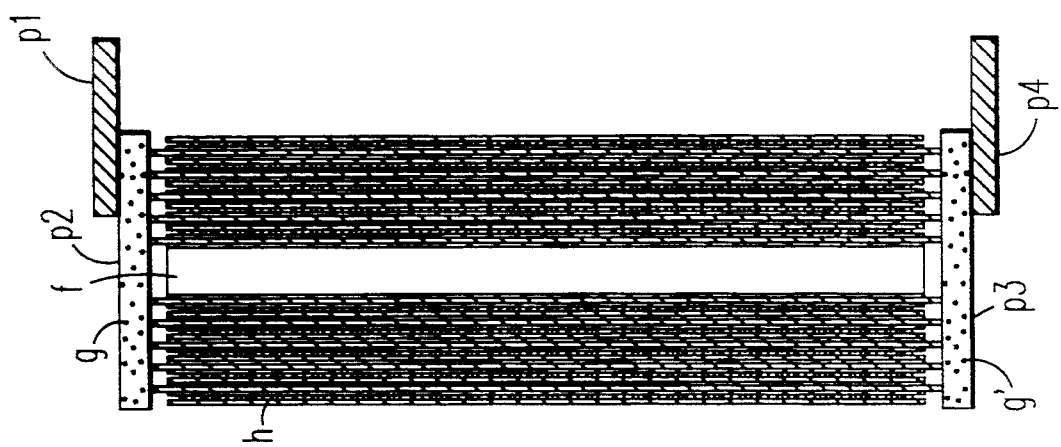
Figure 3B:
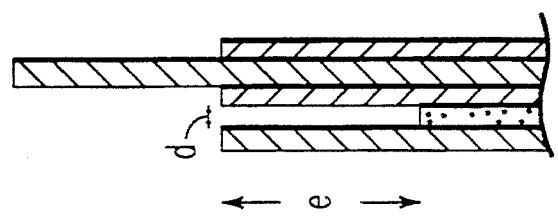
Figure 3A:
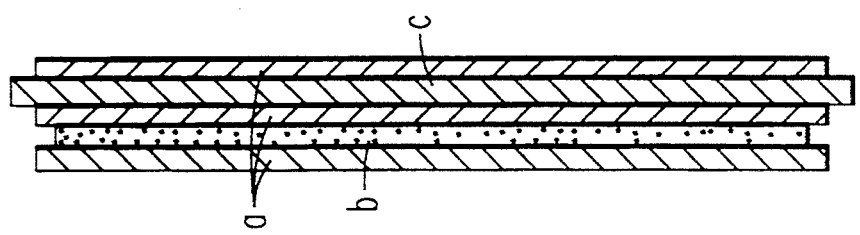
FIG. 3a is a schematic illustration, in cross-section of a laboratory device indicating the respective positions of the films of an electrochemical cell according to the invention.

The respective positions of these five films are indicated in FIG. 3a. The film of lithium exceeds the three films of propylene, placed at the same height, by 3.2 mm while the film of aluminum is set back by 3.2 mm with respect to these three films. FIG. 3a which is used to describe the films and their positions, does not enable to visualize the high ratio between the width of the projections and the thickness of the films, since the latter are illustrated with an enlarged thickness by a factor of about 100 to facilitate the identification of the films. In the medallion illustrated in FIG. 3b, this ratio is reduced to 10, which already enables to understand more easily why it is possible to contact the excess of lithium film with a pulverized metal without for this reason short-circuiting the film of aluminum which is set back, e, and which is accessible only through opening, d, corresponding to its thickness. FIG. 3c illustrates a winding of 4 meters produced with the five films described in FIG. 3a on a plastic mandrel of 1.5 mm, f. The representation is schematical and illustrates only that a number of lateral turns of contact outlet, g and g' are schematic and the various contact devices under study are described in the example which follows. Measurements of contact resistances between lithium and the lateral collectors are obtained by a 4 point method. A current of 10 Amp. is allowed to circulate between points P1 and P4, FIG. 3c, while the intermediate points, P2 and P3, are used as probes to measure local contact resistances. The film of aluminum, b, is electrically accessible at h, and it is intended to detect possible short-circuits resulting from the application of various lateral contacts produced according to the invention. The relative thickness of the assembly of co-wound films is determined so as to be near the spaces between the films and the lateral projections of a complete generator such as described in the example which follows.

Figure 4C:
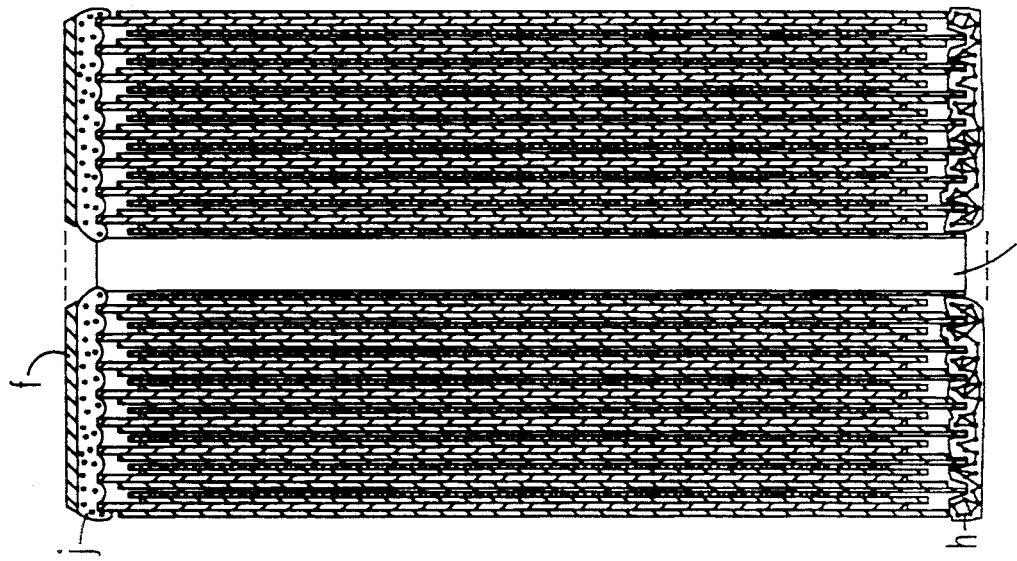
FIG. 4c is a schematic illustration in cross-section of a generator according to the invention, illustrating the contact outlet device.
Figure 4B:
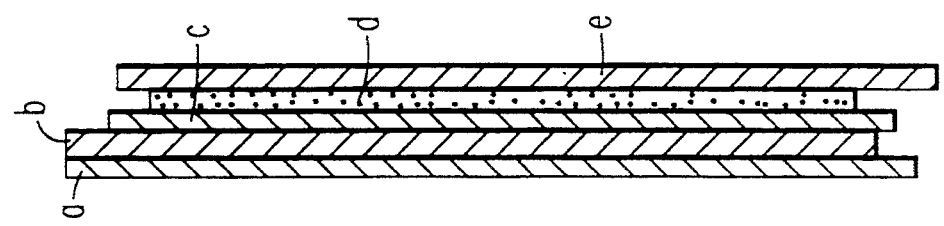
Figure 4A:
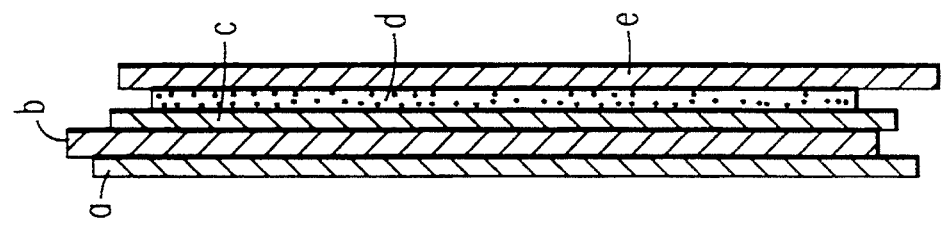
FIG. 4a is a schematic illustration of a polymer electrolyte generator according to the invention, illustrating the relative positions of the films used.

FIG. 4 describes more in detail a complete polymer electrolyte generator obtained by winding various components by utilizing either of the contact outlet devices for the sheets of free aluminum of the anode: FIGS. 1b, 1c, 1d and 1e. The relative positions of the films used are indicated in FIG. 4a. A variant of this arrangement is also schematically illustrated in FIG. 4b, in which, lithium without additional metallic collector is supported on a film of adherent polypropylene in order to facilitate certain modes of mounting. The films used to produce the generator and the manner of obtaining the lateral projections required for the lateral collection of the anode are illustrated in 4a, 4b and 4c, they are:

a—an insulating film of polypropylene 20 microns thick,
b—a sheet of free lithium 35 microns thick laterally projecting at the upper end by about 6.3 mm relative to the cathode and its aluminum collector,
c—a polymer electrolyte, 30 microns thick, laterally projecting past the collector of the cathode at the upper end by 2.2 mm on the one hand, as well as past the sheet of lithium at the other end of the generator on the other hand,
d—a vanadium oxide base composite cathode film 45 microns thick in lateral recess on its aluminum collector,
e—an aluminum collector for the cathode, 18 microns thick, laterally projecting beyond the lower end by about 6.3 mm relative to the sheet of lithium,
f—a second rigid metal, with high melting point, chemically compatible with lithium and having good electrical and heat conductivity to enable heat exchange towards the outside of the generator,
g—plastic nucleus or internal mandrel of the generator having an external diameter of about 1.3 cm,
h—lateral contact outlet device of the cathode applied on the projection of its aluminum collector,
i—a lithium base intermediate metallic layer in intimate contact with the sheets of lithium and with a second metal, f, which is rigid and compatible with lithium.

In full details, the contact outlet device of the anode illustrated on the generator of FIG. 4c is the one of FIG. 1b as obtained from the pulverization apparatus of FIG. 2. However, the elements f and j may also illustrate the contact outlet device produced with the devices of FIGS. 1c and 1d. In the latter case, element f is removed and element j then consists of a metal which is rigid and compatible with lithium, preferably obtained by arc pulverization.

The manners of obtaining lateral projections of the cathode and the lateral contact outlets are given by way of non-limiting examples, and many other technical solutions are applicable to this electrode, for example welding of the sheets of aluminum collector, application of silver base conductive paste, pulverization of zinc or aluminum.

Examples 1 to 3 describe contact outlet devices according to the invention and the ways of producing them. These examples are carried out on the projections of the sheets of lithium of the two ends of the symmetrical windings described in FIG. 3. The interest of these devices is to enable to specifically study the contact resistance between the sheets of lithium and their lateral collection device. The external dimensions of the rolls used are: width 13.6 cm, diameter of internal plastic nucleus, g, 1.3 cm, external diameter of winding, 3.0 cm.

The length of the films used was 4 meters. The values of the local resistances are obtained through a 4 point measuring device illustrated in FIG. 3c which enables to determine local contact resistances. In this manner, the electrical contact resistance between the sheets of lithium and the lateral contact device is verified. Three different tests are then used to evaluate and compare the quality of the contact:

1—measurement of the contact resistance after mounting the lateral collector;

2—modification of this resistance as a function of time at 60° C. for a plurality of days, i.e., the stability of the collectors as a result of shocks and thermic cycles;

3—measurement of the resistance after controlled oxidation, at 60° C., of lithium and its alloys by the gaseous phase. This test is carried out by maintaining the winding of FIG. 3 inside a sealed enclosure containing about 500 ml ambient air so as to cause a superficial oxidation of any surface of lithium which is accessible to the gaseous phase. The lateral collector of the anode of lithium should include an interface lithium or lithium alloy/metal compatible with lithium and which is non-oxidizable and non-reactive, and the weld therebetween should be sufficient to be resistant against a superficial oxidation of the accessible surfaces.

Examples 4 to 7, describe the contact outlet devices mounted on complete generators and confirm the quality of the contacts through an analysis of their global performances. These examples describe many types of contact devices made and models of generators produced.

EXAMPLE 1

The first example describes the way of making the contact outlet device illustrated in FIG. 1b on the symmetrical winding 3c.

To make device 1b, the device for pulverizing molten lithium illustrated in FIG. 2 is used. The conditions of use of the device are the following: temperature of the bath of molten lithium: 250° C., approximate temperature and flow of the jet of helium, 250° C. and 150 l/min., pressure above the molten bath: 30 psi. The jet of molten lithium is projected against the end of winding 3c, including a 35 micron projection of a film of lithium. The deposit corresponding to the intermediate conductive layer g, FIG. 1b, is carried out during three passes of about 5 seconds and has a relatively uniform thickness of 1 mm. On the external face of the intermediate layer, there is then applied a sheet of nickel, second hard metal compatible with lithium, f of FIG. 1b, which is welded by local melting of lithium in contact with nickel. The contact resistances corresponding to the weldings of the two collection layers g and f are very good: less than 0.02 milliohms of slice surface of the sheets to be collected. These contact resistances are inferior to the resistances observed between the external collectors and the lateral collectors g and g', of FIG. 3c, for example in the case where the contacts are merely mechanical contacts. No significant change is seen after storage at 60° C. for 7 days and after a superficial oxidation of the surfaces of lithium which are in contact with the gaseous phase during 7 days at 60° C. No short-circuit is noted between aluminum, h, FIG. 3c, and the lateral collectors thus produced. After dismantling, an examination of the mechanical properties of the deposit of pulverized lithium confirms the cohesion of the intermediate metallic layer and its adhesion with the sheets of lithium. The unwinding of the films indeed produces a pulling of the sheet of lithium outside the welding zone with the projected lithium. On the other hand, examination after dismantling of the films indicates no significant degradation of the film of propylene in the proximity of the zone where molten lithium has been projected; however, it can be noted, after a test for pollution in air, that the lithium of the intermediate zone is gray and oxidized in surface. The low resistances noted in this case confirm that the weldings between the sheets, the particles of the intermediate zones and the metal of the second conductive layer are sufficiently mixed to be resistant against a superficial oxidation of lithium or its alloys.

An equivalent test made by using an alloy of lithium and calcium 10% at. in the device of FIG. 2 leads to equivalent resistances and enables to reduce the temperature of the bath of lithium, m, FIG. 2, and to reduce the risks of short-circuit or thermic shocks on the generator.

Two other tests were made by applying in one case a high purity silver base epoxy and in the other case zinc, projected by shooping on the lithium of the intermediate face, give a low initial resistance of 0.08 milliohms for the surface of the lateral slice of the sheets of lithium to be collected, i.e. 1.4 cm (or $35\mu \times 400$ cm) which rapidly increases after storage at high temperature during many days and after a test for pollution in air 3 milliohms. These latter tests confirm that the solution traditionally used for electrical capacitors, are not applicable to the direct lateral collection of the anodes of lithium of a generator.

EXAMPLE 2

This example is directed to the device of FIG. 1c as well as the ways of producing it with the winding of FIG. 3c.

In this type of lateral collection device, the intermediate conductive zone of lithium, i, of FIG. 1c is obtained after assembling the winding by compressing the edges of lithium 3 mm wide and by welding them together by means of an ultrasonic probe. The intermediate layer thus obtained is about 1 mm thick. A sheet of copper is thereafter applied thereto, and the latter is welded to the intermediate layer by local melting of lithium, under inert atmosphere, by means of a heating plate so as to constitute the second conductive layer h, FIG. 1c.

The contact resistances of these collection devices are good, about 0.1 milliohm for 1.4 cm$^2$ of lateral surface of the sheets to be collected and the devices have a good resistance at 60° C. and under a test for pollution by the gaseous phase.

A variant of this test consists in previously coating the copper sheet, h, with a lithium-calcium alloy of lower melting point (10% at. Ca) and which is adherent, so as to facilitate the melting and local welding of the sheet to the intermediate layer i. The mechanical adhesion confirms in this case the quality of the contact device thus produced.

A test which is equivalent to the previous ones in which a powder of copper or nickel is used in a device for plasma pulverization so as to constitute the second metallic layer h, FIG. 1c, also gives resistances which are equivalent and stable in time.

A test which is equivalent to the previous ones in which no inert metal compatible with lithium is welded to the intermediate conductive layer i, FIG. 1c, is made.

A metal such as steel or nickel is mechanically applied against layer i, so as to simulate a direct mechanical contact between the inter-metallic layer and an external casing of a generator. The resistance of this contact is initially low, about 0.05 to 0.10 ohm; however this value increases strongly as soon as the contact is heated at 60° C. or undergoes a pollution test. This test confirms the need to finish the natural collection device of the sheets of the anode with a rigid metal, which is inert and compatible with lithium so as ensure the stability of the contact at the external terminals of the generator without casing.

The absence of short-circuit when applying the second conductive metallic layer h through different processes, confirms the interest of the second intermediate conductive layer based on lithium or alloys thereof to mechanically consolidate the end of the winding 3c and to protect the plastic components thereof during thermic shocks caused by the application of the second inert metal h.

EXAMPLE 3

This example is directed to the device of FIG. 1d as well as the ways of producing it with the winding of FIG. 3c.

This device containing a single layer is obtained by pulverizing under an electrical arc a layer of copper, g, FIG. 1, about 0.5 mm thick directly against the ends of the sheets of lithium which projet by about 3 mm. The apparent difficulty of this type of simple device, is to intimately weld a metal melting at about 1080° C. on a thin metal melting at 180° C. and without on the other hand, damaging the other plastic films, a, FIG. 3a, of the winding, which are located in the vicinity (3 mm) of the latter. The conditions under which this metallic layer is obtained are given in the description of FIG. 3 and also account for the designs of the windings, essentially, the ratio between the width of the projections, e, FIG. 3, and the space, d, FIG. 3, which separates the film and which results from the thickness of the set back film or films. The granulometry of the droplets produced during pulverization under arc, for example in the case of copper, also plays an important role when producing the conductive layer. It has been observed that the presence of a substantial portion of particles of a size substantially equivalent to the thickness of the films of electrolyte and the cathode obtained by adjusting the shape of the jet of compressed air which is injected in the electrical arc improves the reliability of the contacts thus established by reducing the risks of accidental short-circuit resulting from the accumulation of excessively fine powders in the zones where one of the conductive films is set back, d, FIG. 3b. The resistances of the contacts noted on devices obtained by respecting the dimensions indicated have very low contact resistances and an excellent behavior at 60° C. and during pollution tests. The typical values obtained are from 0.01 to 0.02 milliohms/cm² of lateral surface of collector to be contacted.

After dismantling, it is noted that, even after a test for pollution in ambient air, there is a very good coherence of the copper layer and a strong adhesion between lithium and the copper layer which has been consolidated by pulverization.

The interest of this single layer device is that its simplicity and the nature of the materials used, for example copper, optimize to the maximum the electrical conductivity of the collection layer as well as its thermic conductivity which is required for the thermic operation of a generator and its safe operation. On the other hand, the combination of a rapid melting obtained under an electric arc with a jet of cold gas which projects the particles against lithium, makes this process particularly interesting for producing device 1d.

A test made by utilizing iron instead of copper to produce the conductive collection layer j, FIG. 1, under air, produces a deposit which is less coherent and more resistive. However, the use of an inert gas improves the process as well as the appearance of the contacts thus produced. The use of nickel in an equivalent test gives contacts which are more coherent and cohesive even when air is used to project the molten metal under an electric arc.

EXAMPLE 4

This example describes how the contact outlet devices of the anode, schematically illustrated in FIG. 1, (b and c), may be used in a complete polymer electrolyte generator such as schematically illustrated in FIG. 4c.

The external characteristics of the generator used in the form of a cylindrical winding are: internal diameter of the plastic nucleus 1.3 cm, external diameter of the generator 3.3 cm, width of the winding 13.6 cm, length of the films used 4 meters. The elementary cell used for the example is that described in FIG. 4a. It is assembled and wound continuously by consecutive transfer/lamination, of the various films at high temperature. The capacity which has been introduced into the non-optimized generator is 10.9 Wh on the basis of an extrapolation of the performances of laboratory cells 4 cm² using the same materials.

Contact of the anode is made as in FIG. 1c by contacting and welding with ultrasonic waves the edges 3 mm wide of the lithium sheets, b, of FIG. 4a so as to constitute an intermediate layer i, about 1 mm thick. This intermediate layer is then used to protect the other films of the generator from a thermic and mechanical shock resulting from the application of a sheet of copper, h, by superficial fusion welding of the lithium of layer i.

The device for lateral collection of the cathode used in this case comprises a thin layer, about 0.5 mm zinc, obtained by directly shooping on the projections of the aluminum collector of the cathode. FIG. 1e, describes this type of contact where k then consists of pulverized zinc.

A precise verification of the quality of the contacts on the anode is more difficult to obtain with a generator of this size operating at 60° C. An evaluation is made by means of measurements of the interruption of current during discharge. Currents of 0.4 to 4 Amperes, corresponding to discharges varying between 10 and one hour, are used. Such currents are required for applications of the electrical vehicle battery type. The global ohmic decreases observed are about 25 milliohms. These values substantially correspond to excepted values from measurements of the impedance of this type of battery made in laboratory at 60° C. (about 80 $\Omega/cm^2$) after deducting the other contact resistances of the complete measurement device. These results confirm that the resistance of the lateral contact device of the anode, evaluated in Example 2 to be 0.01 milliohm for a 1.4 cm² section of lithium sheet to be laterally collected (35µ by 4 meters) is negligible as compared to the resistance of the electrochemical system taking into account the active surface of the entire winding of 10 Wh.

An additional verification of the quality of the contact device of the anode is obtained by completely discharging the generator at variable rates. The rate of use of the active materials which have been observed correspond to expected values, within the precision of the measurements, which confirms that the entire surface of the anode is well drained by the lateral collector. The variation of the rate of use of the generator with a discharge current between 0.4 and 4 amperes moreover corresponds to that expected from the electrochemical characteristics of the battery, which confirms the good operation of the lateral contacts. The characteristics of ohmic decrease and of rates of utilization of the reactants are not affected in the cycles which follow a test of temporarily exposing the generator in ambient air (500 mls) at 60° C. for 48 hours, which confirms the quality of the weldings used in the lateral contacts of the sheets of the anode.

EXAMPLE 5

This example is equivalent to the preceding example except for the intermediate zone of the contact outlet device of the anode which is that of FIG. 1b produced in the same manner as in example 1. The characteristics of the generator are equivalent to that noted in example 4.

This example and its illustration in FIG. 4c, shows well how the large collection surfaces resulting from this type of lateral contact outlet facilitate heat exchanges. The nature of the lateral contact, its small thickness and its surface highly contribute to the heat transmission between the nucleus of the generator and its external casing, particularly when the cylindrical winding rests directly against the casing, i.e. against the bottom and against the upper cover of the casing, not illustrated in FIG. 4.

EXAMPLE 6

This example uses the contact outlet device of FIG. 1d in which copper is directly pulverized by pulverization under an electrical arc against the edges of the sheets of lithium of a winding described in FIG. 4c and made with laminate 4a. In this case however, the copper deposit corresponds to deposit j of FIG. 4c, while sheet f is removed. The characteristics of the generator are equivalent to those of examples 4 and 5 and the small thermic heating observed the generator when depositing about 0.5 mm copper under air confirms the interest of this process to produce this lateral collection device of thin sheets of lithium.

EXAMPLE 7

This example is identical to the preceding one except for placing the films used to produced winding 4c which is that illustrated in FIG. 4b. In this case, the laminate used to produce the winding includes supported lithium and adheres on a plastic film until reaching the projection zone of the anode. The mechanical and electrical characteristics of the copper deposited confirm that the process of pulverization under an electric arc may be used to deposit very high melting metals, 1000° C., on the lithium of a generator even if the latter is in direct contact with a plastic support.

We claim:

1. In a polymer electrolyte lithium generator comprising at least one multilayer electrochemical cell, each layer of said cell comprising a laminated combination of at least part of a lithium base strip, said strip having opposite ends and opposite edges, said strip having a thickness between about 1 and 50 microns constituting the anode of said cell layer, a collector for said anode, a cathode and a collector for said cathode, a polymer electrolyte disposed between said anode and said cathode, said collectors, said cathode and said polymer electrolyte being also in strip forms, and an electrical contact outlet for the anodes of said at least one multilayer electrochemical cell, the improvement wherein in each said layer at least one edge of said anode extends beyond corresponding edges of said cathode and said collectors to constitute a plurality of anode projections for said multilayer electrochemical cell, said anode projections being equal in number to the number of layers, said electrical contact outlet device for said anodes comprises a metallic layer consisting of at least one rigid metal which is compatible with lithium, said metallic layer being in intimate electrical contact with substantially the entire extending edges of said anodes at one end of the cell, through said anode projections.

2. Polymer electrolyte lithium generator according to claim 1, wherein said generator consists of at least one coiled multilayer electrochemical cell.

3. Polymer electrolyte lithium generator according to claim 1, wherein said generator consists of at least one multilayer electrochemical cell in stacked or zig-zag arrangement.

4. Polymer electrolyte lithium generator according to claim 1, wherein said metallic layer is between 0.05 and 2 mm thick.

5. Polymer electrolyte lithium generator according to claim 4, wherein said metallic layer consists of copper, nickel, iron or alloys thereof.

6. Polymer electrolyte lithium generator according to claim 1, wherein said metallic layer is obtained by pulverization of said metal, either in liquid or semi-liquid form, so as to enable said metallic layer to follow the contour of the edges of the strips of lithium at one end of the cell.

7. Polymer electrolyte lithium generator according to claim 1, wherein said electrical control outlet device contains a conductive and cohesive intermediate metallic zone, consisting of lithium or lithium rich ductile alloys, in intimate contact with said strip at one end of the cell, said metallic layer being in electrical contact with said edges of said anode strip by means of said intermediate metallic zone.

8. Polymer electrolyte lithium generator according to claim 1, wherein the anode strip consists of lithium or a lithium rich alloy or compound.

9. Polymer electrolyte lithium generator according to claim 1, wherein the anode projections are non-supported, the width of said anode projections representing less than about 10% of the useful width of said anode strip.

10. Polymer electrolyte lithium generator according to claim 1, wherein the anode projections are non-supported, the width of said anode projections representing less than about 5% of the useful width of said anode strip.

11. Polymer electrolyte lithium generator according to claim 1, wherein the anode strip is supported on a plastic film consisting either of an insulating film, having a thickness lower than 10 microns, or the polymer electrolyte per se whose thickness is between 5 and 100 microns, the width of the anode projections of the anode strip representing less than about 5% of the useful width of the anode sheet.

12. Polymer electrolyte lithium generator according to claim 11, wherein the insulating film consists of polypropylene or polyethylene.

13. Polymer electrolyte lithium generator according to claim 7, wherein the intermediate metallic zone is formed by the projections of said anode strip, combined in electrical contact with one another so as to consolidate said edges of said anode strip of said cell at one end of the cell and to protect other components, including the insulating film of said cell.

14. Polymer electrolyte lithium generator according to claim 7, wherein said intermediate metallic zone has a thickness between 0.1 and 2 mm and is applied on the edges of the anode strip or strips at one end of the cell.

15. Polymer electrolyte lithium generator according to claim 14, wherein said intermediate metallic zone is also applied on faces of said anode strip in the anode projections of the latter.

16. Polymer electrolyte lithium generator according to claim 14, wherein said intermediate metallic zone consists mainly of lithium or its low melting alloys whose lithium content is higher than 80% atomic and in which the melting temperature is lower than 250° C.

17. Polymer electrolyte lithium generator according to claim 16, wherein said low melting alloys are selected from Li-Ca, Li-Mg, Li-Na, Li-Sr.

18. Polymer electrolyte lithium generator according to claim 7, wherein said metallic layer has a thickness between 0.05 and 2 mm.

19. Polymer electrolyte lithium generator according to claim 18, wherein said metallic layer consists of copper, nickel, iron or alloys thereof.

20. Polymer electrolyte lithium generator according to claim 7, wherein said metallic layer is obtained by pulverizing said metal, in liquid or semi-liquid form.

21. Polymer electrolyte lithium generator according to claim 7, wherein said metallic layer consists of a sheet or a grid welded to said intermediate metallic zone.

22. Polymer electrolyte lithium generator according to claim 21, wherein said sheet or said grid has a thickness between about 0.1 and 2 mm and consists of copper, nickel, iron, molybdenum, titanium or alloys thereof.

23. Polymer electrolyte lithium generator according to claim 7, wherein said intermediate metallic zone consists of projecting zones of said anode sheet welded with one another.

24. Multilayer polymer electrolyte generator according to claim 1, and whose cathode is laterally collected by means of a second device consisting of a projection of its collector in electrical contact with a collection metallic layer.

25. Generator according to claim 24, wherein said collection metallic layer consists of zinc, Al, Ag or alloys thereof.

26. Generator according to claim 24, wherein the collection metallic layers obtained by pulverization on the edges of the cathode collector.

27. Generator according to claim 24, wherein the collection metallic layer is obtained by shooping.

28. Multilayer polymer electrolyte generator according to claim 1 disposed in an external metallic casing in direct contact with the external metallic casing so as to optimize heat exchanges through the anode, and in which the cathode is laterally collected by means of a second device consisting of a projection of its collector in electrical contact with a collection metallic layer.

29. Generator according to claim 28, wherein said collection metallic layer consists of Zn, Al, Ag or alloys thereof.

30. Generator according to claim 28, wherein the collection metallic layer is obtained by pulverization on the edges of the cathode collector.

31. Generator according to claim 28, wherein the collection metallic layers are obtained by shooping.

32. Process for providing a polymer electrolyte lithium generator with an electrical contact outlet device, said generator comprising at least one multilayer electrochemical cell, each layer of said cell comprising a laminated combination of at least part of a lithium base strip, said strip having opposite ends and opposite edges, said strip having a thickness between about 1 and 50 microns forming an anode of said cell layer, a collector for said anode, a cathode and a collector for said cathode, a polymer electrolyte disposed between said anode and said cathode, said collectors, said cathode and said polymer electrolyte being also in strip forms, and an electrical contact outlet device for the anode of said at least one multilayer electrochemical cell, which comprises assembling said polymer electrolyte lithium generator so that in each said layer at least one edge of said anode extends beyond the corresponding edges of said cathode and said collectors to constitute a plurality of anode projections for said multilayer electrochemical cell, said anode projections being equal in number to the number of layers, depositing a metallic layer consisting of at least one metal which is rigid and compatible with lithium at the level of said anode projections so that said metallic layer be in intimate electrical contact with substantially the entire extending edges of said anodes at one end of the cell through said anode projections.

33. Process according to claim 32, wherein said electrochemical cell is prepared as a coiled multilayer.

34. Process according to claim 32, wherein said electrochemical cell is prepared as a stacked multilayer.

35. Process according to claim 32, wherein said metallic layer is deposited at a thickness between 0.05 and 2 mm.

36. Process according to claim 35, wherein said metallic layer consists of copper, nickel, iron or alloys thereof.

37. Process according to claim 32, wherein said metallic layer is obtained by pulverizing said metal, in liquid or semi-liquid form, so that said metallic layer follows the contour of the edges of the strips of lithium at one end of the cell.

38. Process according to claim 32, which comprises forming a conductive and cohesive intermediate metallic zone, consisting of lithium or lithium rich ductile alloys, in intimate contact with edges of said anode strip at one end of the cell, said metallic layer being in electrical contact with edges of said anode strip by means of said intermediate zone.

39. Process according to claim 32, wherein the anode strip consists of lithium or a lithium rich compound.

40. Process according to claim 32, wherein the anode projections are non-supported, and the width of said anode projections represents less than about 10% of the useful width of said anode strip.

41. Process according to claim 32, wherein anode projections are non-supported, and the width of said anode projections represents less than about 5% of the useful width of said anode strip.

42. Process according to claim 32, wherein the anode strip is supported on a plastic film consisting either of an insulating film, having a thickness lower than 10 microns, or on the polymer electrolyte per se whose thickness is between 5 and 100 microns, and the width of the anode projections of the anode strip represents less than about 5% of the useful width of the anode strip.

43. Process according to claim 42, wherein the insulating film consists of polypropylene or polyethylene.

44. Process according to claim 43, wherein the intermediate metallic zone is formed by the combination of the anode projections of said edges of said anode sheet so as to be in electrical contact with one another to consolidate said lateral edges of said anode strip of said cell at one end of the cell and to protect other parts, including the insulating film of said cell.

45. Process according to claim 44, wherein the anode projections of said lateral edges of said anode strip at one end of the cell are mechanically united.

46. Process according to claim 44, wherein the anode projections of said lateral edges of said anode strip at one end of the cell are thermally united.

47. Process according to claim 44, wherein the anode projections of said lateral edges of said anode strip at one end of the cell are united by mechanical pressing of said strips with one another at the level of said anode projections.

48. Process according to claim 44, wherein the anode projections of said lateral edges at one end of the cell are united by ultrasonic welding.

49. Process according to claim 44, characterized in that the anode projections of said lateral edges at one end of the cell are united by local melting of the anode strips.

50. Process according to claim 44, wherein the intermediate metallic zone is prepared by application, under inert atmosphere, of an added metal containing lithium or alloys thereof in molten or semi-molten state, through mechanical pulverization, pulverization under an electric arc, or application of lithium or its low melting alloys, so as to give a deposit which is conductive and cohesive and which consolidates the edge of the anode strip of the cell.

51. Process according to claim 51, wherein said intermediate metallic zone is prepared at a thickness between 0.1 and 2 mm and it is applied on the edge of said anode strip or strips.

52. Process according to claim 51, wherein said intermediate metallic zone is also applied on the faces of said anode strip in the anode projection of the latter.

53. Process according to claim 52, wherein said intermediate metallic zone consists mainly of lithium or its low melting alloys whose lithium content is higher than 80% atomic and whose melting temperature is lower than 250° C.

54. Process according to claim 53, wherein said low melting alloys are selected from Li-Ca, Li-Mg, Li-Na, Li-Sr.

55. Process according to claim 38, wherein the application of the metal or metals in the intermediate zone is selected from processes of mechanical pulverization of molten lithium under a jet of inert gas at a temperature between 150° and 250° C., processes of pulverization under an electric arc utilizing lithium in the form of rods and processes of welding by direct contact with molten lithium, as an alloy melting below the melting point of lithium.

56. Process according to claim 43, wherein the process of pulverization under an electric arc uses rods of lithium produced by local extrusion directly in a shooping device.

57. Process according to claim 32, wherein said metallic layer is deposited at a thickness between 0.1 and 2 mm by application of Cu, Ni, Fe or alloys containing these elements by pulverization processes, through plasma pulverization under an inert gas or under an electric arc with an inert gas or air in the case of copper and nickel.

58. Process according to claim 38, wherein said metallic layer is deposited at a thickness between 0.1 and 2 mm by application of a sheet or grid of Cu, Ni, Fe, Mo, Ti or alloys containing these elements, and forming an electrical, thermic or mechanical weld between this sheet and the alloy of lithium of the intermediate zone, by spot-welding, by local melting of lithium alloy or by ultrasonic waves.

59. Process according to claim 32, wherein the anode strips are stacked by cylindrical winding or in flat condition, or by zig-zag or discontinuous stacking.

60. Process according to claim 32, which comprises providing a lateral contact at the opposite edge of the anode by aluminum or zinc shooping on a projection of the collector metal of the cathode, so as to provide two electrical contacts.

61. Process according to claim 32, wherein the operations of applying contact outlets on the generator are carried out in air, by pulverization under electric arc with zinc or aluminum for the cathode and copper or nickel for the metallic layer of the anode.

* * * * *